UNITED STATES PATENT OFFICE.

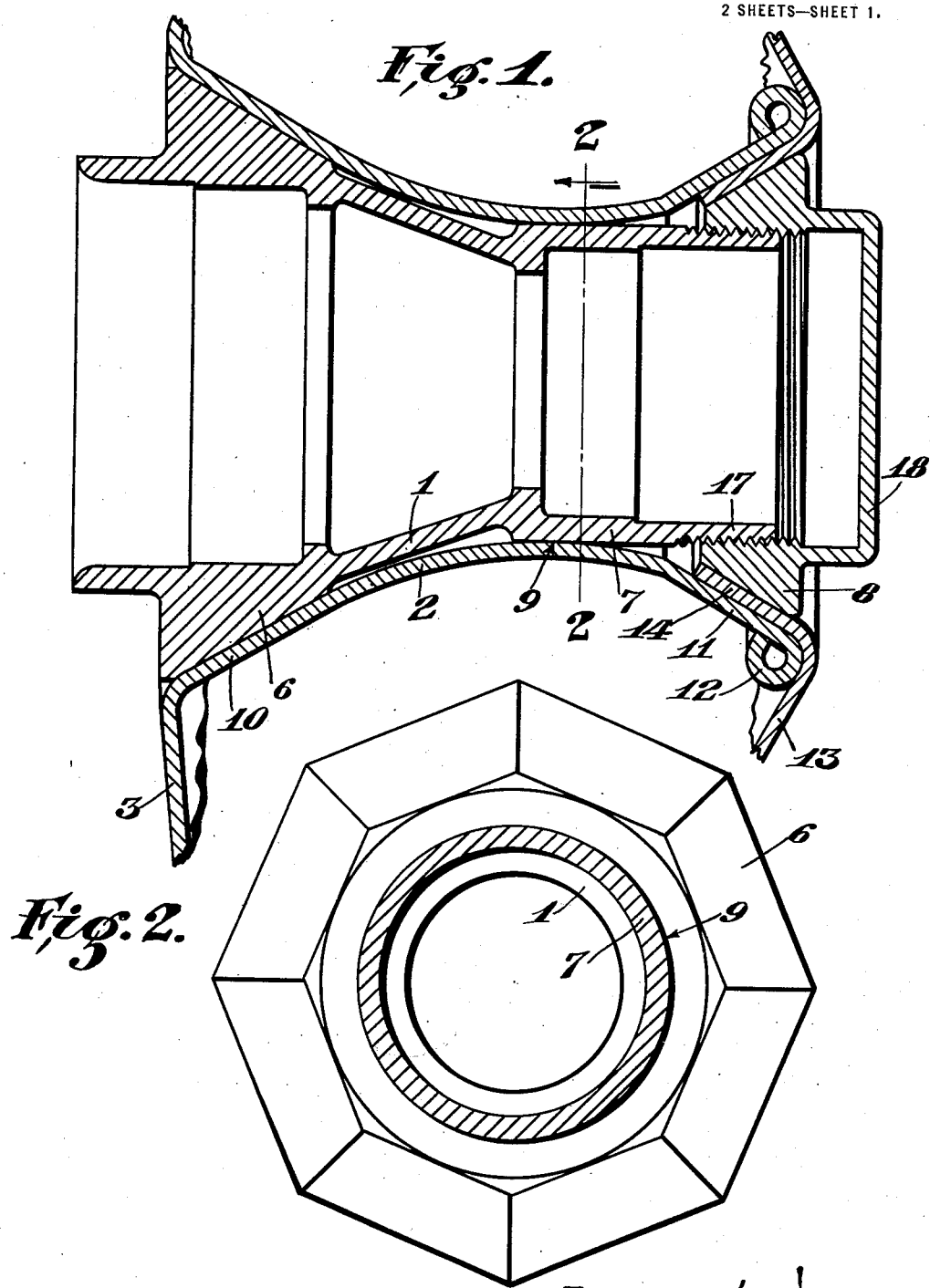

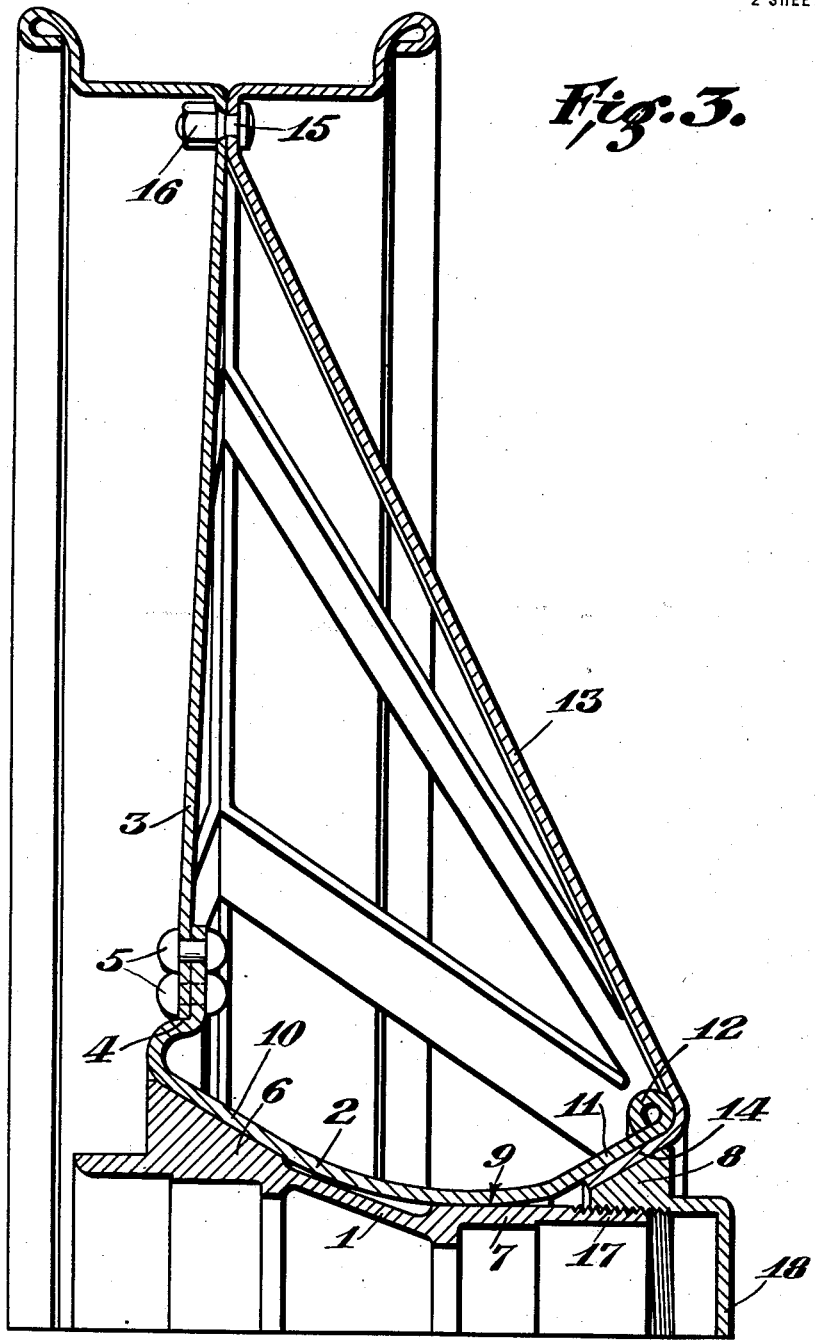

OLIVER G. SIMMONS, OF SAN ANTONIO, TEXAS, ASSIGNOR TO SIMMONS WHEEL COMPANY, OF SAN ANTONIO, TEXAS.

PRESSED-METAL WHEEL.

1,325,120.     Specification of Letters Patent.     Patented Dec. 16, 1919.

Application filed June 12, 1916. Serial No. 103,113.

*To all whom it may concern:*

Be it known that I, OLIVER G. SIMMONS, a citizen of the United States, residing in San Antonio, in the county of Bexar and State of Texas, have invented new and useful Improvements in Pressed-Metal Wheels, of which the following is a specification.

This invention relates to certain new and useful improvements in pressed metal wheels of the type shown and described in my prior Patent, No. 1,179,768, dated April 18th, 1916. The invention is directed more particularly to improvements in the construction of the hub members and in the manner of assembling and securing in position the associated hub ends of the two hub members of the wheel. As in my prior patent referred to, the wheel as a whole is readily removable and the two members of the wheel may be quickly separated for the purpose of demounting the tire.

In the accompanying drawings—

Figure 1 is a vertical sectional view of the inner and outer hub of my improved wheel, the wheel sections being shown in fragmentary portions;

Fig. 2 is a section on the line 2—2 of Fig. 1, but with the outer hub member removed; and Fig. 3 is a vertical sectional view of one-half of the wheel, and illustrating the inner wheel section as being suitably connected to the outer hub member instead of being formed integral therewith, as shown in Fig. 1.

Referring now to the drawings, the numeral 1 indicates the inner hub member and the numeral 2 the outer hub member. This latter may be formed integral with the inner wheel section 3, as shown in Fig. 1, or separately, as shown in Fig. 3, in which case the outer hub member will be provided with an annular shouldered portion 4 for engagement with the inner circular edge portion of the section 3, and the hub member and section will be riveted together, as indicated at 5, or welded, or both. The inner hub member 1, as shown at the left of Figs. 1 and 3, is in the form of a frustum of a pyramid, as indicated by the numeral 6. The outer end portion of the hub member 1 is cylindrical in form, as indicated at 7, and is screw-threaded on its outer end to receive the interiorly screw-threaded cone nut 8. The outer hub member 2 has a bearing contact with the cylindrical portion of the hub member 1 at the portion indicated by the numeral 9, for the purpose of holding said outer hub concentrically with reference to the inner hub. The inner end portion of the outer hub member 2, indicated by the numeral 10, is of frusto-pyramidal form, conforming in shape to the shape of the inner hub member 1 at the portion indicated by 6. The outer end portion of said outer hub 2 is flared from the portion indicated at 9 to its outer end, as indicated by the numeral 11, such flared portion conforming to the cone angle of the nut 8; and the outer end of said hub member is turned upon itself to form a bead 12 for the purpose of adding strength. Such strengthening of the outer hub member permits the use of a much lighter-gage steel than would otherwise be possible. The outer wheel section 13 is provided with an in-turned conical hub end 14, the cone angle of which conforms with that of the flared portion 11 of the outer hub and with the cone angle of the cone nut 8. The inner and outer wheel sections 3 and 13 are detachably connected at their peripheries by means of bolts 15 and nuts 16, as in the construction of my prior patent, the head of the bolts being preferably welded to the flat peripheral portion of the outer wheel section so that when the two sections are separated by removing the nuts 16, the bolts will be carried by the outer wheel section as an integral part thereof. This is desirable, though not essential. As will be clearly apparent from the drawings, the wheel sections are assembled with the conical hub end 14 of the outer wheel section 13 located within the conical flared portion 11 of the outer hub member 2. The cone nut 8 is then screwed upon the screw-threaded end 17 of the hub 1, and screwed home, which operation results in wedging together the associated hub ends 11 and 14 of the two wheel sections, and also in wedging the frusto-pyramidal portion 10 of the outer hub 2 upon the like-shaped portion 6 of the inner hub 1. The latter connection, owing to the non-circular shape of the two members, prevents turning of the outer hub 2 upon the inner hub. The conical nut 8 is provided with an outer hexagonal or other non-circular portion 18 to receive a wrench for the purpose of turning it in the usual manner.

It will be readily seen that to demount the wheel it is only necessary to remove the cone nut 8 when the wheel as a whole may be removed from the hub member 1. Should it be desired to demount the tire then it is only necessary to unscrew the nuts 16 when the two sections 3 and 13 of the wheel may be easily pulled apart. The parts of the wheel may also be as rapidly assembled and secured in position on the hub.

While I have illustrated in the drawings the preferred and most desirable embodiment of my invention, so far as my present experience extends, it is to be understood that I do not wish to be confined to relative sizes and proportions of parts, or to the particular design illustrated, as these may be varied as experience may indicate to be desirable without departing from the spirit of my invention.

I claim:

1. A pressed metal wheel of the class described comprising an inner wheel section having a hub member provided with a flaring end portion having a turned-over or beaded edge, and an outer wheel section having an in-turned hub end entering and being detachably associated with the flaring portion of said hub member and forming with the adjacent portion of its wheel section a rounded shoulder seating against said beaded edge.

2. A wheel of the class described comprising a hub, an inner and outer pressed metal wheel section, each of which is provided with a unitary, inwardly-directed hub member surrounding said hub, one of said hub members having an enlarged end portion receiving the other hub member, and the wheel section of the latter abutting against the outer end of said enlarged end portion.

3. A wheel of the class described comprising a hub, an inner and outer pressed metal wheel section, each of which is provided with a unitary, inwardly-directed hub member surrounding said hub, one of said hub members having an enlarged end portion located at one side of the wheel, receiving the other hub member, and the wheel section of the latter abutting against the outer end of said enlarged end portion.

4. A wheel of the class described, comprising a hub, an inner and an outer wheel section, the inner wheel section having a hub member surrounding said hub and provided with a flaring outer end, and an outer wheel section having an inturned conical hub member located within and detachably associated with the flared end of the first named hub member.

5. A wheel of the class described comprising an inner hub, a wheel section having an outer hub member mounted on said hub and provided with a flaring end, an outer wheel section provided with an in-turned conical hub member adapted to enter the flared portion of said outer hub member, and a nut engageable with said inner hub and having a portion adapted to bear against and hold the hub member of the outer wheel section in engagement with the flaring portion of the hub member of the inner wheel section.

6. A wheel of the class described comprising an inner hub having a non-circular portion, an inner wheel section having a hub member mounted on said inner hub and having a part shaped to conform to the non-circular portion thereof and provided with a flaring end portion, an outer wheel section having an in-turned hub member adapted to enter and bear against the flaring portion of said outer hub member, and a cone nut adapted to engage said inner hub and to wedge said engaging portions of the hub members of the wheel section together and the non-circular portion of the hub member of the inner wheel section into firm engagement with the non-circular portion of said inner hub.

7. A wheel of the class described comprising an inner hub having a frusto-pyramidal inner portion and a cylindrical outer portion, an inner wheel section having a hub member shaped at one portion to conform to said frusto-pyramidal part of the inner hub, a central portion to have surface contact with the cylindrical part of said inner hub and beyond said central portion having a flaring end portion, an outer wheel section having an in-turned hub end adapted to enter the flared portion of said hub member, and a nut adapted to engage the outer end of said inner hub and having a portion adapted to engage and bind said hub end in firm engagement with the flaring portion of said hub member, and to wedge the frusto-pyramidal portion of said hub member into firm engagement with the like portion of said inner hub.

8. A pressed metal wheel comprising a hub, two unitary peripherally-converging parts constituting opposite side members of the wheel, each part consisting of a rim section, an inwardly-directed hub member surrounding said hub and a connected web section, one of said hub members having an enlarged end portion receiving the other hub member, and the wheel section of the latter abutting against the outer end of said enlarged end portion.

In testimony whereof, I have hereunto set my hand.

OLIVER G. SIMMONS.